United States Patent [19]

Voight

[11] 4,382,607
[45] May 10, 1983

[54] STEERING SYSTEM FOR A TRAIN OF RAIL-LESS VEHICLES

[75] Inventor: Edward T. Voight, Worthington, Ohio

[73] Assignee: The United States of America as represented by the United States Department of Energy, Washington, D.C.

[21] Appl. No.: 243,318

[22] Filed: Mar. 13, 1981

[51] Int. Cl.³ .................. B60D 1/14; B62D 53/00
[52] U.S. Cl. .................. 280/408; 180/14 R; 198/303; 280/419; 280/444
[58] Field of Search .......... 280/408, 443, 444, 410, 280/419, 411 R, 81 B; 198/303; 180/14 R

[56] References Cited

U.S. PATENT DOCUMENTS

| | | | |
|---|---|---|---|
| 1,416,613 | 5/1922 | Colardeau | 280/419 |
| 2,525,555 | 10/1950 | Manierre | 280/408 |
| 2,673,091 | 3/1954 | Planalp | 280/443 |
| 2,798,587 | 7/1957 | Bergmann | 198/303 |
| 3,300,023 | 1/1967 | Creutzmann et al. | 198/36 |
| 3,889,977 | 6/1975 | Nakawaki | 280/408 |
| 4,134,601 | 1/1979 | Probst | 280/408 |

Primary Examiner—Joseph F. Peters, Jr.
Assistant Examiner—Donn McGiehan
Attorney, Agent, or Firm—Hugh W. Glenn; Robert J. Fisher; Richard G. Besha

[57] ABSTRACT

A steering system for use with a multiple vehicle train permits tracking without rails of one vehicle after another. This system is particularly useful for moving conveyor systems into and out of curved paths of room and pillar underground mine installations. The steering system features an elongated steering bar pivotally connected to each of adjacent vehicles at end portions of the bar permitting angular orientation of each vehicle in respect to the steering bar and other vehicles. Each end portion of the steering bar is linked to the near pair of vehicle wheels through wheel yoke pivot arms about king pin type pivots. Movement of the steering bar about its pivotal connection provides proportional turning of the wheels to effect steering and tracking of one vehicle following another in both forward and reverse directions.

15 Claims, 7 Drawing Figures

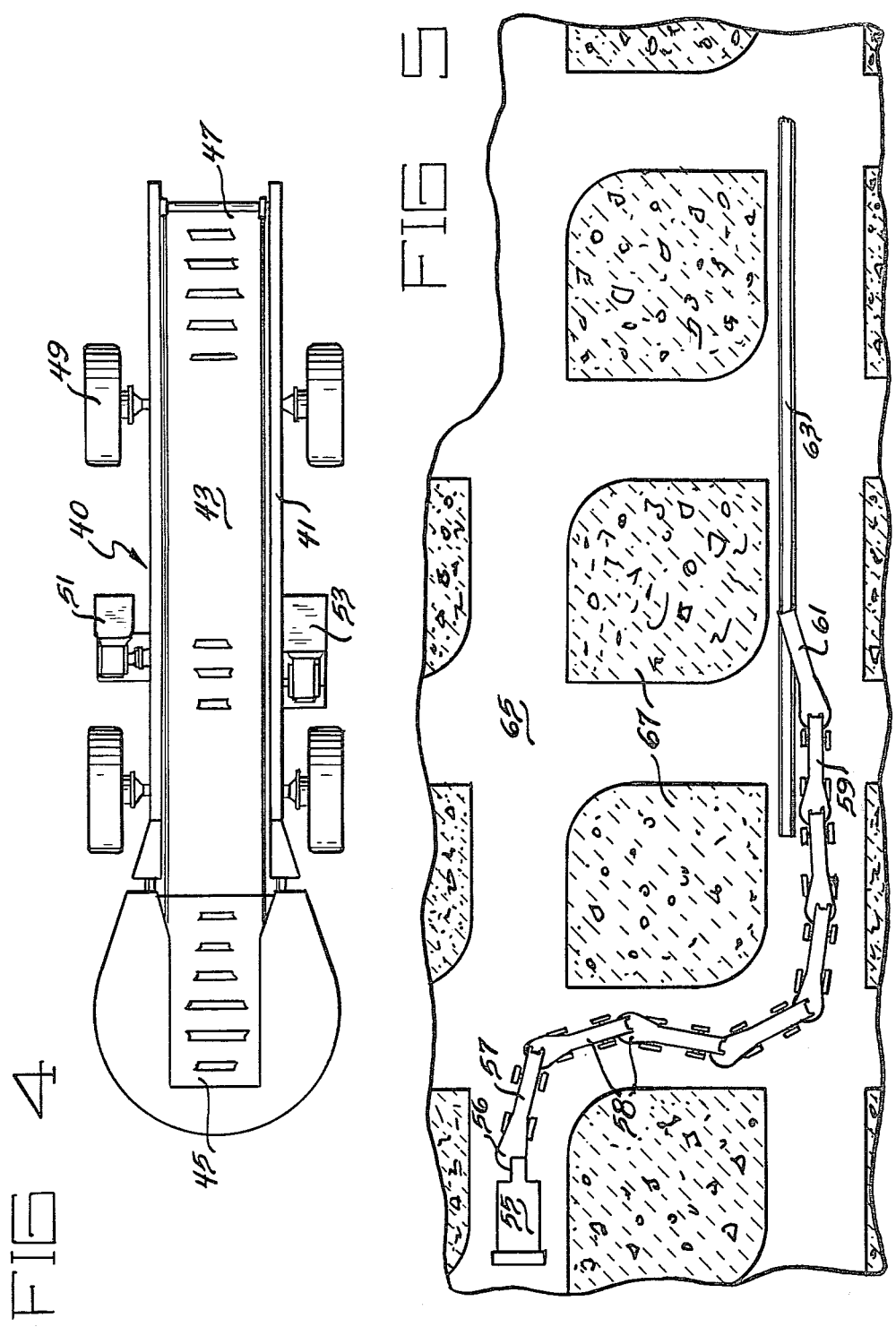

STEERING SYSTEM FOR A TRAIN OF RAIL-LESS VEHICLES

CONTRACTUAL ORIGIN OF THE INVENTION

The United States Government has rights in this invention pursuant to Contract No. DE-AC22-75ET12525 between the U.S. Department of Energy and Jeffrey Mining Machinery Division-Dresser Industries, Incorporated.

BACKGROUND OF THE INVENTION

The present invention relates to steering systems for use with trains of vehicles that roll on wheels without engaging rails for guidance. One particular application is in continuous haulage systems that employ a series of mobile conveyors for moving such as coal or other mined material from underground mines. In room and pillar underground mining locations, a conveyor train may be required to advance and return along a curved or serpentine course during the mining operation. Consequently, true tracking of one vehicle behind another is of great importance in both forward and reverse movement of the conveyor train vehicles. Other important applications may include trains of vehicles carrying luggage at airports, etc. and trains conveying goods into and out of warehouse storage.

Early prior steering systems for trains of vehicles have involved the wagon or Bogie system in which the front wheels of each vehicle are mounted on a common axle pivoted at its center with a steering bar connection to the preceding vehicle. Jackknifing and skidding are common in such systems. King-pin steering systems along with various adaptations to improve tracking have been attempted. A double knuckle has been incorporated in steering linkages between fore and aft vehicles with means to hold either knuckle rigid. However, a change in the rigid and flexible knuckle is required in changing from forward to reverse. Connection between fore and aft wheels on a common vehicle have been incorporated to provide equal turns in opposite directions as the vehicle is steered.

In other systems, an array of wheel axles are connected by cross-bars and stabilized by springs between adjacent axles. The springs lie outside the cross-bar links and stretch or compress to accommodate and stabilize motion during turns. This system would appear to allow the vehicle tires to skid or roll on their rims. Slack in the linkage also may permit deflection.

Bridge carrier systems have been used in which alternate vehicles are controlled by an operator. Slender conveyors form bridges between the controlled vehicles so that the material can be cascaded along the series of conveyors carried by the controller vehicles and bridges. However, when more than two or three operated vehicles become necessary, coordination between operators becomes complicated. Bridge conveyors often use long conveyor unit vehicles to maximize conveying distance with fewer operators. Consequently, the space required for turns is lengthened.

SUMMARY OF THE INVENTION

Therefore, it is an object of the present invention to provide a steering system for use in a train including a plurality of vehicles permitting tracking of each vehicle behind a preceding vehicle along a curved path.

It is also an object to provide such a steering system within a train of vehicles to permit tracking in forward and reverse directions.

It is a further object of the invention to provide a combined steering and coupling system between adjacent vehicles within a train of vehicles.

It is an additional object to provide a steering coupling system for a train of vehicles whereby intermediate cars in the train can track preceding cars without the attention of individual operators.

It is yet another object of the invention to provide a steering system for use with vehicles within a train of vehicles in which tracking error recovery adjustments are included.

It is yet another object to provide a rail-less train of series connected vehicles with a steering system adapted to provide accurate tracking of individual vehicles in both forward and reverse directions along a curved path.

It is a still further object to provide an individual vehicle having a steering system capable of connection to adjacent vehicles and capable of exhibiting true tracking behind that adjacent vehicle along a curved path.

It is likewise another object to provide a rail-less train of vehicles carrying a continuous haulage system for conveying solid material along curved paths from within room and pillar type mine formations.

In accordance with the present invention, a steering system couples one vehicle to an adjacent vehicle within a multiple vehicle train. The steering system includes a pair of wheels, each wheel of which are separately connected to a generally vertical pivot of the one vehicle for supporting a portion of its weight. Pivotal arms are provided with each wheel of the pair adapted to effect turning of the wheel about its pivot in the steering of the vehicle. A second pair of wheels are similarly connected through generally vertical pivots to the adjacent vehicle. Pivotal arms are provided on each wheel of the second pair for effecting turning during steering of the vehicle. An elongated steering bar is pivotally connected at its opposite end portions respectively to the one vehicle and to the adjacent vehicle. Linkage means connect the respective end portions of the steering bar to the pivotal arms associated with the wheel pair on the corresponding vehicle. A linkage means is so provided that the wheels are positioned at a proportional angle to the angle of the steering bar in respect to the vehicle longitudinal axis. This steering system results in accurate tracking of the first pair of wheels and second pair of wheels along curved paths traversed by the train of vehicles.

In more specific aspects of the invention, the steering bar pivotally connected between the first and the adjacent vehicle is of sufficient strength to accommodate forces between the vehicles during movement of the train and is substantially the only load bearing coupling member connected between the adjacent vehicles.

In another more specific aspect, the linkage means include a pair of crossed linkage members connected at one of their ends to outward widthwise margins of the steering bar end portion and at their opposite ends to the individual wheel pivot arms. The linkages are connected to corresponding wheel pivot arms at locations disposed longitudinally toward the steering bar.

In another important aspect of the invention, the linkage means and steering bar are connected to the vehicle and to the adjacent vehicle in a manner to provide wheel deflection at an angle of about one-half the angle of the steering bar deflection in respect to the longitudinal axis of the corresponding vehicles.

In one other more specific aspect of the invention, there are provided adjustment means for moving the linkage connections transversely respecting the steering bar pivot on the vehicle.

The present invention further contemplates a train of vehicles adapted for rail-less operation in which each vehicle includes a plurality of pivotally attached wheels. The vehicles are coupled together only by a plurality of steering bars, each of which are pivotally connected at opposite end portions to adjacent vehicles. Each steering bar is provided with linkage means between its longitudinal end portions and the near wheel pair on the associated vehicle. The linkages and steering bars are so arranged that the wheel position in a turn is about one-half the angle of the steering bar in respect to the vehicle longitudinal axis. In further more specific aspects of this train, there are included at one end a receiving vehicle with conveyor means for collecting solid material, a discharge vehicle at the opposite end with conveyor means for discharging the solid material and intermediate vehicles for cascading the solid material between the receiving and discharge vehicles. Each of the vehicles of the train carry a continuous haulage conveyor as a portion of an overall continuous haulage system. In one other specific aspect, each vehicle in the train includes a self-contained propulsion system capable of propelling at least that individual vehicle along the surface on which it rests.

BRIEF DESCRIPTION OF THE DRAWINGS

The present invention is illustrated in the accompanying drawings wherein:

FIG. 4 is a plan view of a vehicle for use in a train carrying a multiple unit continuous haulage system.

FIG. 5 is a schematic illustration of a train of vehicles employed along a serpentine path in a room and pillar mine location.

DETAILED DESCRIPTION OF THE PREFERRED EMBODIMENT

Figure 1:
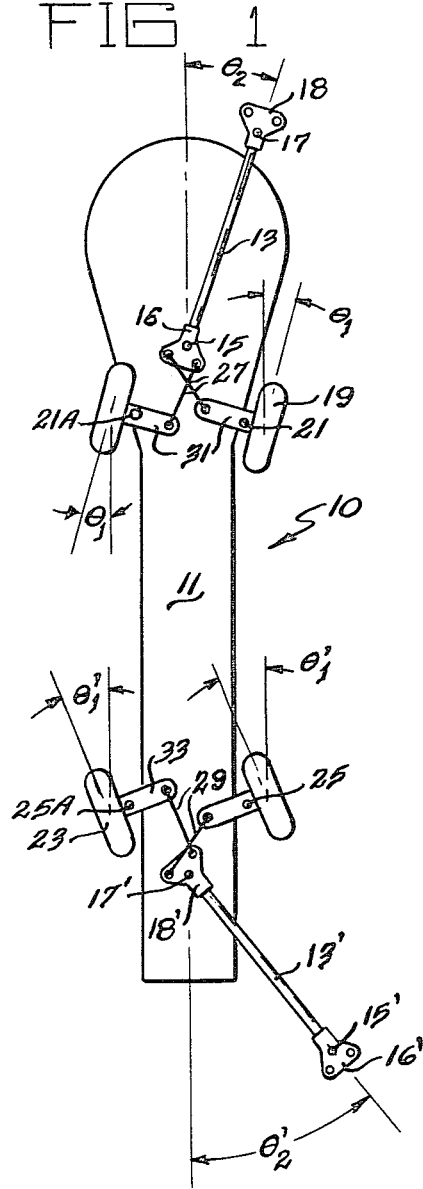
FIG. 1 is a schematic view of a vehicle and steering system.

In FIG. 1 a vehicle 10 having a body frame 11 is schematically illustrated with a steering system suitable for use within a train of coupled vehicles. The steering system includes a steering bar 13 that is pivotally connected to the frame 11 of vehicle 10 at a pivot 15 on the longitudinal axis of the vehicle. A second pivotal connection 17 is located at the opposite end portion of steering bar 13 for connection to an adjacent vehicle. Similarly, pivot 17' is connected to steering bar 13' at the opposite end of vehicle 10. The end portions 16, 18 of steering bar 13 are illustrated of increased width to provide suitable locations for tie rod connections as will be described.

Steering bar 13 and its pivotal connections are of sufficient strength to sustain the tension and compressive forces expected in the ordinary operation of the train of vehicles. This is an important aspect of the steering system as other coupling members connected to the vehicle frames become unnecessary. The steering bar serves the combined functions of coupling the vehicles along with deflecting the wheels to a proper turning angle.

Vehicle 10 is illustrated and typically includes a forward wheel pair 19 and a rear wheel pair 23. Each of the wheels is separately held on a king-pin pivot 21, 21A, 25 and 25A to the vehicle frame 11. The four king-pin type pivots, for purposes of this application, will define the wheel base as well as the longitudinal axis of the vehicle 10.

Pivot arms 31 and 33 are illustrated as part of the wheel yokes joining wheels 19, 23 individually to the wheel pivots 21, 21A, 25 and 25A. Crossed tie rod pairs or linkages 27 and 29 are connected between the end portions of pivot arms 31, 33 and the end portions 16, 18' of the steering bars 13, 13'. The tie rods thus form linkage means between wheel pairs 19, 23 and the corresponding steering bar end portions 16, 18' to transmit angular movement or deflections of the steering bars and produce a proportional deflection of wheels during movement of the train along a curved path.

It will be seen that the steering bar positions in vehicles along a curved path "record" or "remember" the path such that motion may be interrupted or reversed as may be necessary in a mining operation without interfering with proper tracking of successive vehicles. The steering bar positions on one vehicle at a particular point in a curved path will be assumed by a subsequent adjacent vehicle when it reaches that same point to provide correct steering and tracking of vehicles.

As illustrated in FIG. 1, the deflection or turning angle $\theta_1$ of the wheels in wheel pair 19 from the longitudinal axis of the vehicle wheel base bear a proportional relationship to the deflection $\theta_2$ of the connected steering bar 13 from the axis. The relationship of angular wheel deflection to steering bar deflection is about equal to the wheel base length, e.g. the distance between wheel pivots 21 and 25 and the vehicle spacing. Vehicle spacing is the distance between common points on corresponding adjacent vehicles, for instance, between pivot 17' and pivot 17. It is, likewise, the axial length between rear wheels 23 and corresponding rear wheels of the preceding vehicle (not shown). The vehicles illustrated in FIG. 1 and the other drawings of this application have wheel base length to vehicle spacing length of about 0.5 and accordingly have linkages between steering bars and wheel pivot arms to provide wheel turning deflections of about 0.5 in respect to the deflection of the steering bar from the longitudinal axis of the vehicle. Merely by way of example, a practical train for use in room and pillar mining opeations may include vehicles of about 5 foot tread width with a wheel base length of 9 feet, steering bar lengths of 5.4 feet and vehicle spacing of 19 feet. In such a vehicle the steering bar pivots are 6.8 feet on the longitudinal axis from the vehicle center.

This relationship of about 2:1 between the steering bar angle and the angle of wheel deflection is the appropriate angle for a train of vehicles to track wheel pair after wheel pair while moving in a continuous curve. The example given of wheel deflection equal to about one-half steering bar deflection is about that needed for a vehicle train in which individual vehicle bases are about one-half vehicle spacing. These spacings can be altered in respect to wheel base, however, as a practical matter these relationships will be about 0.4 to 0.6 or preferably about one-half. Considerably shorter spacings in respect to the wheel base provide cumbersome trains while much longer spacings in respect to wheel base unduly increase the turning radius of the train of vehicles.

Figure 2:
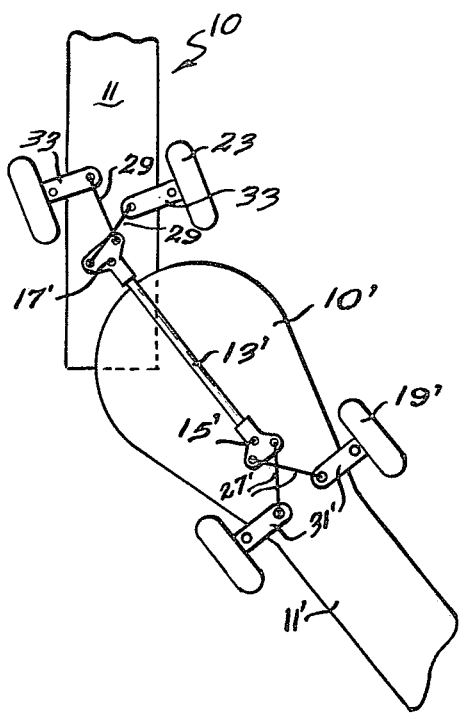
FIG. 2 is a fragmentary view of two adjacent vehicles coupled by a steering bar with linkages.

FIG. 2 illustrates the coupling and steering bar linkage of one vehicle 10 to an adjacent vehicle 10'. Steering bar 13' is pivotally connected at points 17' and 15' to the vehicle frames 11 and 11', respectively. In a moving train, the relative positions of the two vehicles affect the alignment of the steering bar 13' and accordingly the positioning of the wheel pairs 23 and 19' to effect tracking.

The steering bar and linkage means on the fore and aft pairs of wheels of vehicle 10 are arranged in symmetrical although oppositely facing configurations. As seen in FIGS. 1 and 2, the steering configuration at the front of a vehicle is essentially the same as that illustrated at the rear the vehicle. This symmetry involves, among other factors, the axial location of the steering bar pivots 15 and 17' in respect to the wheel base as well as the lengths of steering bars 13, 13', tie rods 27, 29 and the points of connection of the tie rods 27 and 29 to the steering bar and wheel pivot arms 31 and 33. As is illustrated, the dimensions, locations and angular arrangements of these two symmetrical steering arrangements on vehicle 10 are nearly identical but in opposite facing orientations. It is also seen that the steering configurations are essentially the same on vehicles 10, 10' and the other vehicles in the train.

Figure 3:
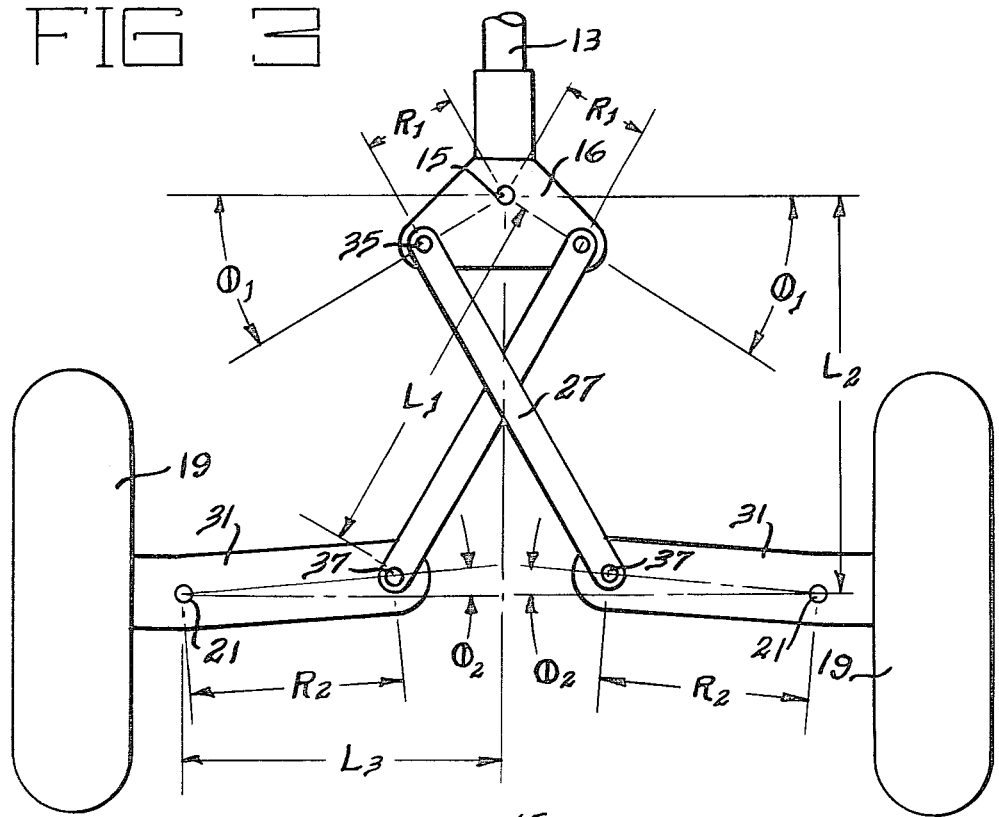
FIG. 3 is an enlarged fragmentary schematic view showing the linkage geometry of a steering bar coupling system.

FIG. 3 shows an enlarged schematic of the linkage between the steering bar and the wheel pivot arms. Crossed tie rods 27 connect between the end portion 16 of steering bar 13 and the wheel yoke pivot arms 31 of wheels 19. The tie rods are connected to opposite width-wise margins of the steering bar end portions at locations 35 and to the ends of pivot arms 31 at points 37. Pivot arms 31 are angled slightly towards the steering bar and thus receive the tie rods at points 37 slightly towards the steering bar end portion. These slight deviations from the square wheel base, illustrated as $\Phi_2$, for the pivot arm linkage connections provides an Ackermann type steering geometry which permits the inside wheel on a curve to deflect at a slightly greater angle than the outside wheel.

In the FIG. 3 illustration the steering system is designed to provide appropriate values to permit about a 1° deflection of the wheels with each 2° deflection of the steering bar. Table I gives various dimensions and angles that are important in providing the desired steering relationship for the vehicle.

TABLE I

| FIG. 3 DESIGNATION | | VALUE |
|---|---|---|
| $R_1$ - | Distance from steering bar pivot to the tie rod connection. | 6.9 in. |
| $\Phi_1$ - | Angle of the tie rod connection point about the steering bar pivot. | 30° |
| $R_2$ - | The length of the wheel yoke pivot arm between the wheel pivot and the tie rod connection. | 16.2 in. |
| $\Phi_2$ - | Angle of the tie rod connection point from the wheel pivot. | 5° |
| $L_1$ - | Length of the tie rod. | 27.1 in. |
| $L_2$ - | Longitudinal distance between wheel and steering bar pivots. | 27.5 in. |

TABLE I-continued

| FIG. 3 DESIGNATION | | VALUE |
|---|---|---|
| $L_3$ - | Lateral distance between wheel and steering bar pivots. | 25 in. |

The values provided in Table I are merely one set which will give the desired about 1° wheel deflection for each 2° deflection in the steering bar. Other sets of values in which all lengths are in proportion to those given may also provide suitable steering and tracking within a vehicle train. However, substantial deviations in only one or two of the values in a set can produce unacceptable wheel steering angles.

One other example of suitable values for the lengths of the steering linkages of FIG. 3 are given in Table II. The angles $\Phi_1$ and $\Phi_2$ are the same as those shown in Table I. The lengths given in Table II are somewhat less advantageous than those of Table I as the use of this latter set of dimensions requires much tighter connections with less play at the tie rod connection 35, 37 than those of the linkage dimensions given in Table I.

TABLE II

| FIG. 3 DESIGNATION | INCHES |
|---|---|
| $R_1$ | 3.0 |
| $R_2$ | 8.0 |
| $L_1$ | 30.7 |
| $L_2$ | 27.5 |
| $L_3$ | 25.0 |

It will be understood that other sets of values can be used in proper proportion to obtain the desired relationship of steering bar to wheel deflection. Also it is advantageous to provide adjustments in the tie rod lengths ($L_1$) to ensure that the vehicle wheels can be aligned parallel to the longitudinal axis of the vehicle.

FIG. 4 illustrates a vehicle that can advantageously employ the steering system of the present development. The vehicle 40 includes a frame 41 that carries a continuous conveyor 43 such as a chain or a belt conveyor for mined solid material. A receiving portion 45 of the vehicle and conveyor is disposed at a lower elevation than the discharge portion 47 to permit a cascading of the solid material from one vehicle conveyor to the next. As illustrated the vehicle is provided with wheels 49 and a drive motor 51 for forward and reverse vehicle motion. A separate drive motor 53 provides power for the continuous conveyor 43.

Vehicle 40 as illustrated is suitable as an intermediate vehicle within a train of such vehicles. A similar type vehicle with a specially adapted receiving portion for coordinating with such as a continuous mining machine can be used as a lead vehicle in a train. The lead vehicle may also contain an operator's compartment with the appropriate train controls.

Another vehicle of the same type can be used as a discharge vehicle at the end of the train. The discharge vehicle correspondingly would be provided with suitable conveyor and discharge implements for feeding the conveyed mined material into another system such as a permanently installed belt or chain conveyor.

FIG. 5 illustrates schematically a train of vehicles operating in a serpentine or curved path within a room and pillar mine excavation. The train is lead by a continuous mining machine 55 followed by a lead or receiving vehicle 57, a plurality of intermediate vehicles 58 and a discharge vehicle 59. The discharge vehicle 59 is provided with a transition conveyor 61 that is adapted to slide or move in roller engagement with an elongated permanently installed continuous conveyor 63.

Particulate material such as coal cut from the walls of the mine by continuous miner 55 is received in the receiving end portion or hopper 56 of lead vehicle 57. The material cascades from the continuous conveyor of vehicle 57 to and along the series of intermediate conveyors carried on intermediate vehicles 58. The conveyor on discharge vehicle 59 and transition conveyor 61 then passes the material onto the permanently installed conveyor 63.

In the operation of the conveyor train, the operator rides on the lead vehicle 57 and maintains its receiving hopper 56 in alignment with the discharge of the continuous miner 55. A second operator may be employed to monitor the operation of discharge vehicle 59 and the transition conveyor 61. As the continuous miner 55 moves forward the operator in lead vehicle 57 merely follows the miner with the feed hopper 56 beneath the miner discharge. Intermediate vehicles 58 and discharge vehicle 59, through the action of their steering bars, faithfully track the forward motion of vehicle 57. Passages 65 can thus be cut in the underground mine leaving a plurality of pillars 67 for roof support. To retreat from an individual passage, the operator of lead vehicle 57 puts the train in reverse and no longer attempts to maintain his feed hopper 56 beneath the miner discharge. Lead vehicle 57 now becomes the last vehicle in the train and its rear wheels are steered such that it faithfully follows the path of the preceding intermediate vehicle 58.

The serpentine path which the train has taken into the room and pillar excavation is recorded in memory by the positions of the steering bars of each of the intermediate vehicles 58 within the train. As the train retreats from a room 65, discharge vehicle 59 moves parallel to the permanent conveyor 63 followed by the remainder of the intermediate vehicles 58 which retrace the path dictated by the position of their steering bars. As each intermediate vehicle 58 moves through a curved portion of the path, it sets its following steering bar to steer the succeeding vehicles along the same path.

Figure 6:
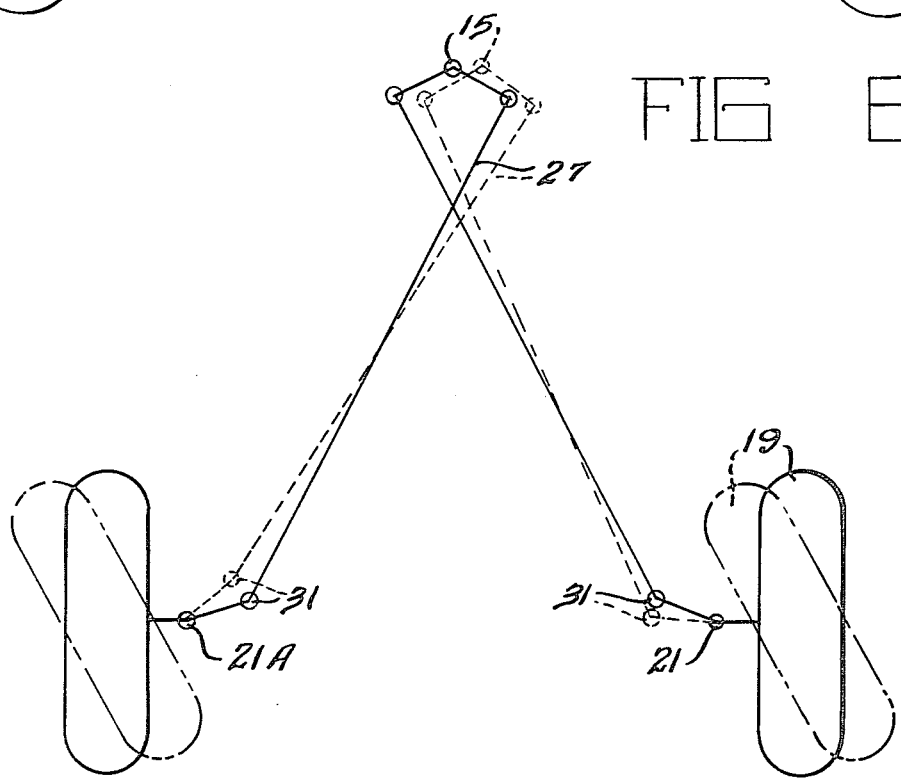
FIG. 6 is a schematic illustration of a tracking error recovery system.

In some instances a slippery mine bottom or steep grade may cause a vehicle within the train to drift into and bind against a pillar or other obstruction. One manner of recovering from such an occurance is illustrated in the tracking error recovery system of FIG. 6. In FIG. 6 the elements are schematically illustrated and are given like reference numbers to those used in the forward wheel pair and steering bar assembly of FIG. 1. However, it will be understood that this tracking error recovery system can be included at each pivotal connection of each steering bar in the train.

The tracking error recovery is provided by including means for laterally translating the steering bar pivot 15. As is illustrated, this biases wheel pair 19 in a direction opposite that of the lateral translation to permit movement of the affected vehicle away from the obstruction. Both the front and the rear wheels of the affected vehicle are deflected or biased in the same direction which will result in an appropriate biasing of steering bars to provide an offset in the entire train of vehicles to the side of the obstruction. It is of importance that both the front and rear wheels of the vehicle be provided with the same bias. The biasing of only one pair of wheels will result in a series of tilted or cocked vehicles in the train that may not avoid the obstruction.

Figure 7:
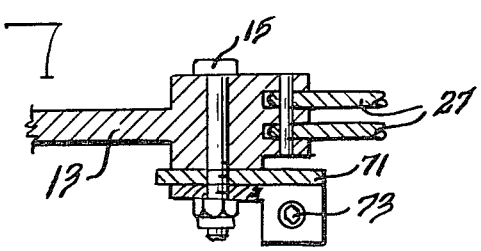
FIG. 7 is an enlarged fragmentary cross section of a steering bar connection mechanism that can be used with a tracking error recovery system.

One manner of providing the translation of the steering bar is illustrated in FIG. 7. Pivot 15 of steering bar 13 is mounted on a plate 71 carried by the vehicle frame. Plate 71 includes a slot (not shown) through which the steering bar pivot passes. The slot permits lateral translation of the pivot in respect to the vehicle frame. An appropriate crank and screw mechanism 73 engages pivot 15 so as to force it laterally within the slot provided in plate 71.

It will therefore be seen that the present invention provides an improved steering system for a train of vehicles as it advances and retreats along a serpentine path. The train is guided by the positioning of steering bars pivoted at opposite ends on each vehicle. As the lead vehicle moves forward along the curved path, the intermediate vehicles faithfully follow. By setting the last vehicle in the train along a straight course, a driver or operator on the lead vehicle may reverse the entire train merely by following the path of the vehicle immediately to its rear. A tracking error recovery system is provided for making adjustments within the train when one vehicle is slid or otherwise moved into an obstruction. The tracking error recovery provides an offset within the original train that becomes a part of the path traversed by the following vehicles. The system is particularly well adapted for moving a series of conveyors following a continuous mining machine within a room and pillar type amine excavation.

Although the present invention has been described in terms of particular embodiments and construction it will be clear to one skilled in the art that various modifications can be made in terms of materials, methods and structural design within the scope of the accompanying claims.

I claim:

1. A steering system for coupling one vehicle to an adjacent vehicle within a train including a plurality of vehicles comprising:

a first pair of wheels, each separately connected at a generally vertical pivot to said one vehicle for supporting a portion of its weight, each wheel of said pair provided with pivotal arms adapted to accept force moments for effecting turning of the corresponding wheel, in respect to said one vehicle longitudinal axis, a second pair of wheels, each wheel connected about a separate pivot to said adjacent vehicle for supporting a portion of its weight, each of said second pair of wheels having a pivotal arm adapted to accept force moments for effecting turning movement of the corresponding wheel in respect to said adjacent vehicle longitudinal axis, an elongated steering bar having opposite lengthwise end portions of greater width than its central portion pivotally connected at one end portion of its length to said one vehicle and pivotally connected at a second opposite end portion of its length to said adjacent vehicle, said steering bar is of sufficient strength to accomodate all tension and compressive stresses between said vehicles during ordinary longitudinal movement of the train of vehicles, first linkage means connecting the one lengthwise end portion of said steering bar to the pivotal arms of the wheel pair on said one vehicle for positioning said wheels at an angle proportional to the angle of said steering bar in respect to said one vehicle longitudinal axis; and a second linkage means connected between the second lengthwise end portion of said steering bar and the individual pivot arms of said second pair of wheels on said adjacent vehicle for positioning said wheels at an angle proportional to the angle of said steering bar in respect to said adjacent vehicle longitudinal axis, said first and second linkage means each are connected to one of said end portions of greater width at a location disposed outwardly along the steering bar length from its points of pivotal connection to said one vehicle and to said adjacent vehicle, whereby movement of said train results in tracking of said second pair of wheels along the path of said first pair of wheels.

2. The steering system of claim 1 wherein said one vehicle and said adjacent vehicle are substantially free of load-bearing coupling members other than said steering bar interconnecting said vehicles.

3. A steering system for coupling one vehicle to an adjacent vehicle within a train including a plurality of vehicles comprising:

a first pair of wheels, each separately connected at a generally vertical pivot to said one vehicle for supporting a portion of its weight, each wheel of said pair provided with pivotal arms adapted to accept force moments for effecting turning of the corresponding wheel, in respect to said one vehicle longitudinal axis, a second pair of wheels, each wheel connected about a separate pivot to said adjacent vehicle for supporting a portion of its weight, each of said second pair of wheels having a pivotal arm adapted to accept force moments for effecting turning movement of the corresponding wheel in respect to said adjacent vehicle longitudinal axis, an elongated steering bar pivotally connected at one end portion thereof to said one vehicle and pivotally connected at a second end portion thereof to said adjacent vehicle, said first and second end portions being at opposite longitudinal ends of said steering bar, first linkage means connecting the one end portion of said steering bar to the pivotal arms of the wheel pair on said one vehicle for positioning said wheels at an angle proportional to the angle of said steering bar in respect to said one vehicle longitudinal axis, a second linkage means connected between the second end portion of said steering bar and the individual pivot arms of said second pair of wheels on said adjacent vehicle for positioning said wheels at an angle proportional to the angle of said steering bar in respect to said adjacent vehicle longitudinal axis, whereby movement of said train results in tracking of said second pair of wheels along the path of said first pair of wheels, said first linkage means comprises a first and a second crossed linkage, each linkage connected at opposite width-wise margins of the one end portion of said elongated steering bar and individually connected one each to the pivotal arm of each wheel of said pair on said one vehicle, said second linkage means comprises a first and a second crossed linkage, each linkage connected at opposite width-wise margins of the second end portion of said steering bar and individually connected one each to the pivotal arms of each wheel of said pair on said adjacent vehicle.

4. The steering system of claim 3 wherein said first linkage means comprises first and second crossed linkages that are substantially the same as those of said second linkage means, in respect to dimensions and connection locations to corresponding steering bar end portions and corresponding pivotal arms.

5. The steering system of claim 4 wherein said first and said second crossed linkages are connected to corresponding wheel pivotal arms at locations disposed longitudinally toward said steering bar with the corresponding wheels aligned parallel to the vehicle longitudinal axis.

6. The steering system of claim 3 wherein said steering bar along with said first and second linkage means are so connected to said one vehicle and to said adjacent vehicle such that said first wheel pair makes an angle of about one-half that of the angle of said steering bar to the longitudinal axis of said one vehicle and said second wheel pair makes an angle of about one-half that of said steering bar to the longitudinal axis of said adjacent vehicle.

7. The steering system of claim 3 wherein said elongated steering bar is connected between pivotal points on the longitudinal axis of said one vehicle and of said adjacent vehicle.

8. The steering system of claim 3 wherein means are provided at each end portion of said steering bar for laterally translating its pivotal connection in respect to the longitudinal axis of the vehicle on which said steering bar end portion is connected.

9. The steering system of claim 3 wherein the linkages means interconnecting the end portions of said steering bar and wheel pivotal arms are connected at inward locations axially respecting the pivotal connections of said steering bar and wheels on said one and on said adjacent vehicle.

10. A train of vehicles including a plurality of the steering system of claim 3 installed between and coupling adjacent vehicles of said train.

11. A vehicle for coupling into a train of such vehicles capable of rail-less tracking along a curved path, said vehicle comprising:

a frame, first and second steering configurations independently mounted for separate pivotal movement, one each at opposite end portions of said frame length, each of said steering configurations including, a pair of wheels each wheel pivotally connected by a separate vertical pivot to said vehicle frame, a steering bar pivotally connected at one end portion thereof to said vehicle frame at an axially aligned location, said steering bar provided at an opposite end portion thereof with means for pivotal connection to an adjacent vehicle, and linkage means between said pivotally connected end portion of said steering bar to each wheel of said pair of wheels whereby the angle of said steering bar is proportional to the angle of each wheel of said pair to the longitudinal axis of said vehicle frame.

12. A rail-less train of series connected vehicles, each vehicle having front and rear independently mounted pairs of wheels for separate pivotal movement supporting said vehicle, each wheel pivotally connected through a vertical pivot to said vehicle, said vehicles coupled together only by a plurality of steering bars each pivotally connected at its opposite end portions between adjacent vehicles and each steering bar provided with linkage means connected from its longitudinal end portions to adjacent wheel pairs on the corresponding vehicle for positioning said pair of wheels at a turning angle independent of the turning angle of the other pair mounted on said vehicle whereby the wheels of each vehicle in the moving train of vehicles closely track the wheels of the preceding vehicle.

13. The rail-less train of claim 12 wherein each vehicle includes self-contained propulsion system capable of propelling at least that individual vehicle along the surface on which it rests.

14. The rail-less train of claim 12 wherein the individual cars of said train carry a continuous haulage system for conveying solid material, said train including a receiving vehicle for collecting said solid material and a discharge vehicle at the opposite end thereof for discharging said solid material to a stationary conveying system and intermediate vehicles coupled between said receiving and discharge vehicles, each of said intermediate vehicles including a receiving end portion and a discharge end portion wherein said discharge end portion being at a higher elevation than said receiving end portion to permit cascading of solid material between said vehicles.

15. The rail-less train of claim 14 wherein said steering bar and linkage means are oppositely facing but symmetrical on each intermediate vehicle in said train in respect to steering bar length and location of pivotal connections.

* * * * *